May 20, 1924.
F. C. GROCOTT ET AL
1,494,478
SLEIGH CONSTRUCTION
Filed May 16, 1922
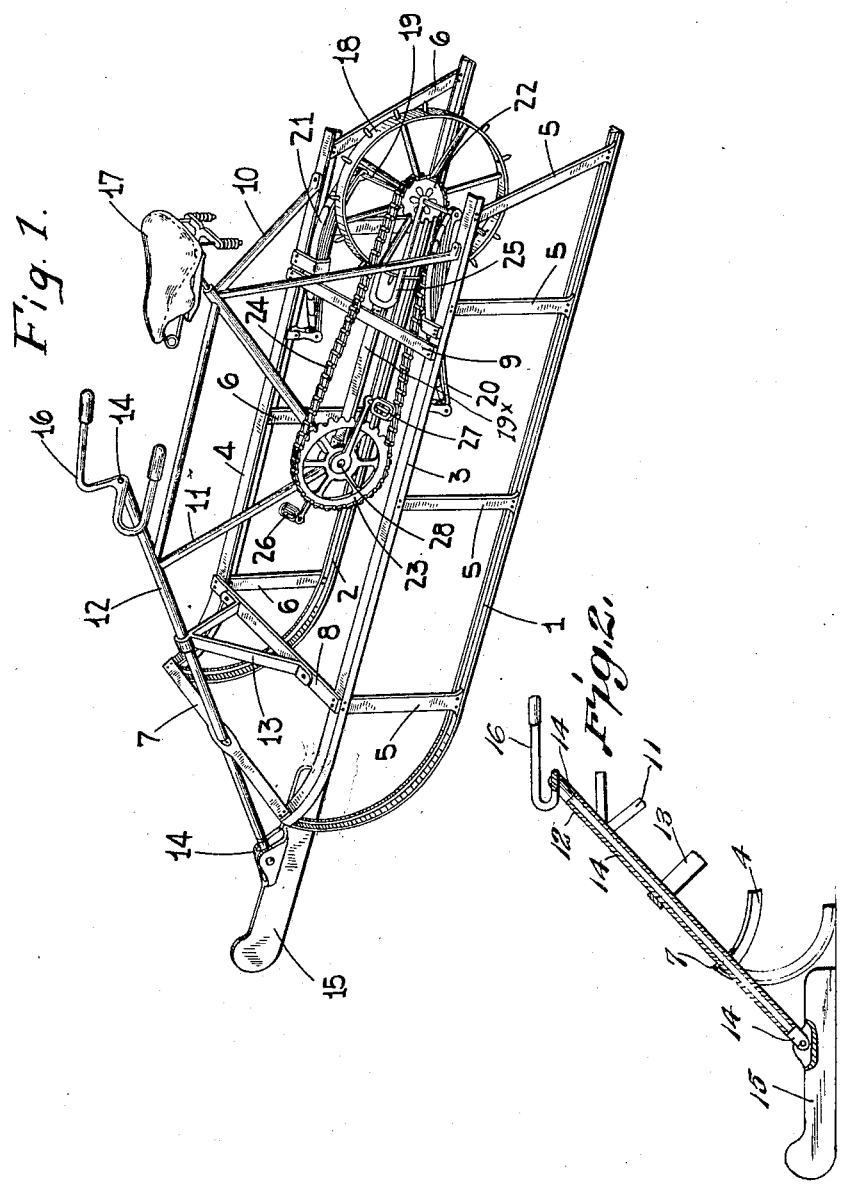
INVENTORS
FREDERICK C. GROCOTT,
NORMAN HENRY JUDAH.
BY
*E. H. Hond*
ATTORNEY Patented May 20, 1924.

1,494,478

UNITED STATES PATENT OFFICE.

FREDERICK C. GROCOTT AND NORMAN HENRY JUDAH, OF CHATHAM, ONTARIO, CANADA.

SLEIGH CONSTRUCTION.

Application filed May 16, 1922. Serial No. 561,487.

*To all whom it may concern:*

Be it known that we, FREDERICK C. GROCOTT and NORMAN HENRY JUDAH, subjects of the King of Great Britain, and each a resident of Chatham, in the county of Kent and Province of Ontario, Canada, have invented certain new and useful Improvements in Sleigh Construction, of which the following is a specification.

The present invention comprehends the provision of a manually operated sleigh adapted for travelling on ice or other similar surfaces.

It is within the province of the disclosure to provide a device of the character described with a view to compactness, durability and in which the number of parts are few, the construction simple and the cost of production low.

These and other objects we accomplish by means of such structure and relative arrangement of parts as will be hereinafter fully described and illustrated in the accompanying drawings, in which Figure 1 is a perspective view of a device constructed in accordance with our present invention. Fig. 2 is a detail showing the connection of the steering post to the runner.

The sleigh forming the body of the device comprises the runners 1 and 2, supporting the parallel aligned members 3 and 4 through the medium of the plurality of standards 5 and 6. The members 3 and 4 are connected by the transverse member 7, 8 and 9. Substantially mounted near the rear of the members 3 and 4 is the fork 10 connected to the triangular frame 11 which supports at the forward extremity thereof the steering column casing 12 which is further supported by the bracket 13 and passes through the transverse member 7. Disposed in the steering column casing 12 is the steering column 14, having pivotally connected on the lower terminal thereof the steering runner 15 and having mounted on the opposite extremity thereof the steering or handle bars 16. Disposed at the rear of the handle bars 16 and in parallel alignment therewith is the saddle 17 for the purpose of carrying the operator.

The device is propelled through the medium of the drive wheel 18 rotatably mounted on the axle 19 supported by the springs 20 and 21, which diffuse shock encountered in the road bed. The numeral 22 indicates a sprocket fast on the drive wheel 18 and which is driven by the sprocket wheel 23 through the medium of the chain 24.

The drive wheel 18 and the sprocket 22 are disposed intermediate the yoke 25 which also supports the axle 19. The bar $19^x$ pivotally connects the forward end of the yoke 25 with the lower apex of the triangle of the frame, as clearly shown. The numerals 26 and 27 indicate pedals fast on the spindle 28 and through this medium the feet of the operator drive the sprocket wheel 23.

In operation, the operator sits on the saddle 17 and places his feet on the pedals 26 and 27. When it is desired to advance, the pedals 26 and 27 are propelled with the spindle 28 in a manner similar to that employed in bicycle propulsion, thus causing the drive wheel 18 to rotate through the medium of the sprocket wheel 23, the sprocket 22 and the chain 24 as hereinbefore described. It will be readily discerned that the device is steered through the medium of the handle bars 16 and the runner 15 which is turned in the direction which the device will assume.

From the foregoing description, it is thought that the construction and mode of operation of our invention will be readily understood and while we have illustrated and described one form of construction thereof, we desire to have it understood that the same is merely illustrative of the embodiment of our invention to which we do not wish to limit ourselves and that deviations from such detail in the practical adaptation of the device may be resorted to as do not form a departure from the spirit of the invention as defined by the appended claim.

What we claim as new is:

In a device of the character stated, runners, transverse members connecting the same, a triangular frame supported on said members, side springs dependingly supported from said runners, a spindle supported in said springs, a drive wheel on said spindle, a yoke supported at one end on said spindle, a bar connecting the other end of said yoke with the lower apex of said triangular frame, a sprocket wheel mounted at said apex, a sprocket chain connecting said wheel and drive wheel, and pedals fast on said sprocket wheel.

In testimony whereof, we affix our signatures in the presence of two witnesses.

FREDERICK C. GROCOTT.
NORMAN HENRY JUDAH.

Witnesses:
　GEO. A. SAYER,
　WM. BURNS.